INVENTOR
HAROLD D. COOK
ATTORNEY

United States Patent Office 3,534,263
Patented Oct. 13, 1970

3,534,263
IN-CIRCUIT TESTING FOR DIODE LEAKAGE
Harold D. Cook, Wheaton, Ill., assignor to Teletype Corporation, Skokie, Ill., a corporation of Delaware
Filed Sept. 3, 1968, Ser. No. 756,801
Int. Cl. G01r 31/22
U.S. Cl. 324—158                                    10 Claims

ABSTRACT OF THE DISCLOSURE

An in-circuit test of the reverse-leakage characteristics of one of a plurality of diodes in a multiple-diode integrated circuit gate is accomplished by placing a current measuring device at the input to one of the other diodes of the gate, and first measuring the current flowing through the current measuring device when the diode under test has equal potentials applied to both terminals. The diode under test then is back-biased by raising the potential at its cathode, and the increase in current through the current measuring device is an indication of the reverse-leakage current through the back-biased diode of the gate under test. The equalizing and back-biasing potentials override the normal input signals applied to the diode.

BACKGROUND OF THE INVENTION

When an electronic circuit fails to function properly, it is desirable to ascertain the location and nature of the failure; so that the circuit may be repaired. When discrete components are used in a wired circuit, it is a relatively simple matter to remove the components from the circuit for individual testing and to replace defective components without risking destruction of other fault-free elements in the circuit. With printed circuits having small discrete components mounted thereon, the problem of testing the components for failure is substantially increased. Most circuit cards, however, carry only a single circuit or a relatively small number of circuits; so that a defective circuit card may be removed from the system and individually tested or discarded and replaced with a properly operating card.

With integrated circuit packages, however, troubleshooting of logic systems is considerably more difficult than troubleshooting of discrete component logic circuits or conventional printed circuit cards. A large number of integrated circuits are usually "fixed wired" (soldered) in position on a single circuit card and these circuits are not easily removed. The heat conducted into a circuit card or an integrated circuit package by way of the leads, during an unsoldering and resoldering operation, frequently destroys the card or the package; even though it may have been fault-free before it was unsoldered from the circuit for testing.

Thus, the only desirable manner of testing integrated circuit logic elements is to test these elements in their normal circuit environment. To test a circuit in this manner, however, presents a number of problems. Currents cannot readily be measured without breaking into the lead in question, nor can the effect of one circuit be separated from another circuit connected to the same node or common connection point. If a number of different driving circuits are connected to different inputs of a multiple-input gate contained in an integrated circuit package and the gate fails to function properly, it is desirable to ascertain whether or not the particular gate or other integrated circuit gates connected to the same nodes of the circuit are improperly operating; that is, desirable to locate the precise gate having a defective input diode, so that the integrated circuit package containing such a diode can be replaced. In the operation of gates, the defect generally is an excessive leakage current in the reverse direction in an input diode, causing a failure of the gate input node to rise above a minimum voltage necessary for proper operation of the circuit. Thus, it is desirable to provide some form of measuring for excessive reverse current leakage in each individual diode of the gates connected to a node without removing any of the integrated circuit packages from the system and without altering the driving inputs normally applied to the gates from other portions of the system.

SUMMARY OF THE INVENTION

In order to test one of a plurality of diodes of a logic gate for reverse current leakage, the input potential to the input of that diode under test is raised to a point just sufficient to cause the potential applied to the input of the diode to be equal to the potential applied to its other terminal; so that no current flows therethrough. A current measuring device then is placed at the input of one of the other diodes of the gate, and the current flowing therethrough is measured. The test input potential then is raised to a point sufficient to substantially back-bias the diode under test, and the increase in current flowing at the output of the diode connected to the current measuring device then is a direct indication of the diode leakage current through the diode under test.

DETAILED DESCRIPTION

Figure 1:
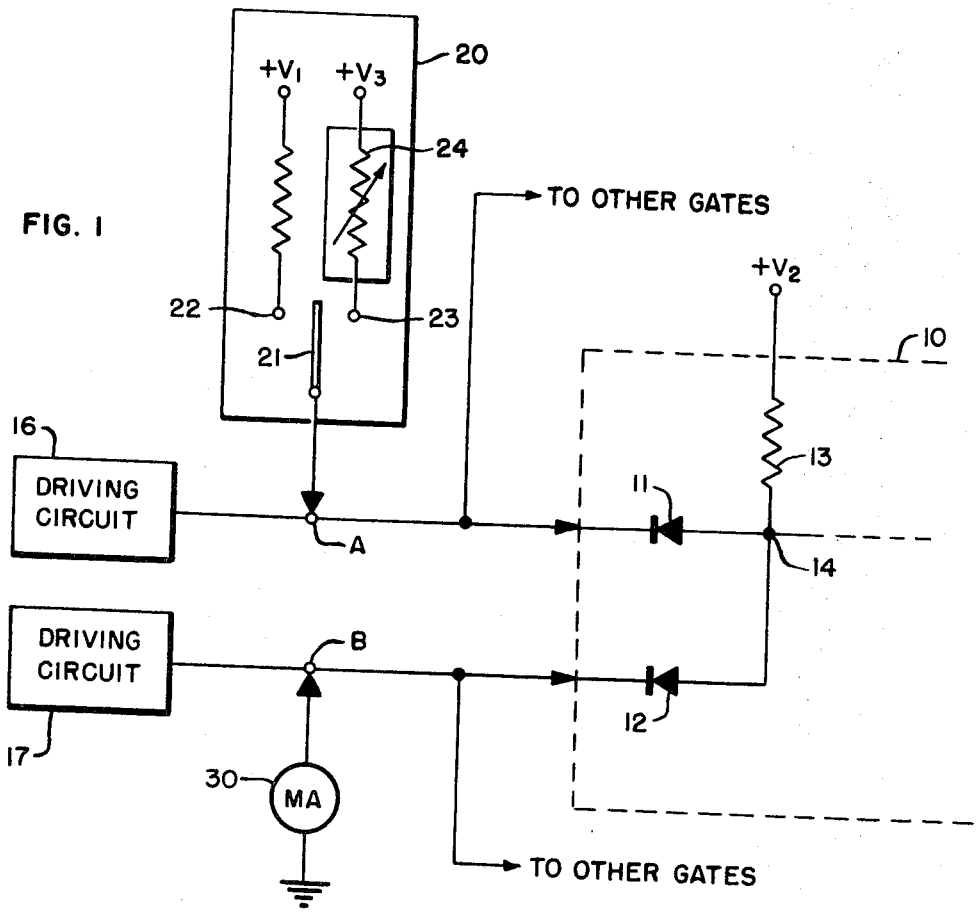
FIG. 1 is a circuit diagram of a circuit being tested in accordance with a preferred embodiment of this invention.

Referring now to FIG. 1, there is shown an input portion of an integrated circuit package 10, with the portion being shown including a two-input gate consisting of a pair of diodes 11 and 12 supplied with a source of positive potential $V_2$ through a resistor 13 connected to the node 14 joining the anodes of the diodes 11 and 12. The node 14 then may be utilized to supply the output signals from the gate consisting of the diodes 11 and 12 to other portions of the integrated circuit package 10. Since these other portions of the circuit form no part of this invention and are unimportant to it, they have not been shown in FIG. 1.

The inputs to the diodes 11 and 12 of the gate shown in FIG. 1 are obtained from suitable integrated circuit driving circuits 16 and 17, respectively; and the driving circuits 16 and 17 generally provide output signals changing between ground potential and a positive potential of an amount sufficient to back-bias the diodes to which they are connected. Thus, the diodes 11 and 12 either conduct fully in the forward direction or are back-biased, so that no current passes therethrough in either direction for a normally operating diode.

Each of the driving circuits 16 and 17 also may be connected to input diodes of other gates in different integrated circuit packages. As a consequence, if a malfunction in a diode in any of these gates occurs, the potential at the output of the driving circuit generally is prevented from attaining the minimum positive potential necessary for the system to operate properly. When this type of malfunction occurs, it is not possible, from an observation of the node voltage, to ascertain which of the several integrated circuit packages, such as package 10, connected to the node is defective. The defect generally is caused by a diode having excessive leakage current in the reverse direction, so it is necessary to identify the particular package having the leaking diode in order that the defective package can be removed from the system and replaced with a properly operating package.

In order to test each of the diodes of the gate in the integrated circuit package 10, one of the diodes of the gate is used to monitor the reverse current leakage of the diode of the gate under test. Since access to all the inputs of the diodes in the gate is available in the integrated circuit package 10, a test input potential, for example, may be applied to the node A connected to the input of the diode 11 under test, and this potential is initially in an amount sufficient to cause the potential applied to the input or cathode of the diode 11 under test to be equal to the potential applied to its anode at the node 14 within the integrated circuit package.

In accordance with a preferred embodiment of the invention, this initial potential is obtained from a probe 20 having located therein a switch 21 which initially is connected to a terminal 22 having a positive potentail $V_1$ connected thereto. The potential $V_1$ is chosen to be sufficient to equalize the potential applied to the node 14 within the integrated circuit package 10. When this is done, no current flows through the diode 11, and the potential applied by the probe 20 to the node A overrides the potential applied to the node A by the driving circuit 16 in the manner described in the copending application to H. D. Cook, Ser. No. 756,775, filed Sept. 3, 1968. At the same time this initial potential is applied to the node A by the probe 20, a low-impedance current measuring device 30 is connected to the node B between the output of the driving circuit 17 and the input to the diode 12 in the circuit package 10 under test. The current flowing through the diode 12 and into the node B is measured by the current measuring device 30 at this time, and this is used as a reference current.

After the reference current has been established, the potential at node A is raised by connecting the switch 21 to a terminal 23 and applying a higher positive potential to the node A from a source of potential $V_3$ through a variable resistor 24 located within the probe 20. The application of this positive potential to the node A, irrespective of the state of the driving circuit 16, can be accomplished in a manner similar to that described in the above-mentioned copending application to H. D. Cook. This potential then back-biases the diode 11, and the current continues to be measured at the node B by the low-impedance current measuring probe 30. Any increase in current flowing through the current measuring device 30, over that which was flowing therethrough when the diode 11 had no current flowing through it in either direction, then is a direct indication of the reverse-leakage current of the diode 11 under test.

In order to test another diode of the gate, the test probe 20 may be connected to the input node at the cathode of the new diode to be tested, and the low-impedance current measuring device remains connected or is reconnected to the input node of a different diode in the same gate as the test diode, and the foregoing test procedure is repeated. Thus, it is possible to measure the reverse-leakage current of each of the diodes in an integrated circuit gate without removing the circuit package from the system of which it is a part and without the necessity of having complete access to both terminals of individual diodes in order to perform the test.

In order to perform the above test of reverse current leakage in the diodes of the gate 10, it is necessary that the current measuring device 30 be a low-impedance current measuring device; so that it can measure the node B current accurately, irrespective of the state of the node B driving circuit 17. If the impedance of the current measuring device 30 is too high, no accurate measurement can be made of the node current when the driving circuit 17 has its output transistor in a state of saturation, or where the driving circuit 17 presents a relatively low impedance between the node B and ground.

Figure 2:
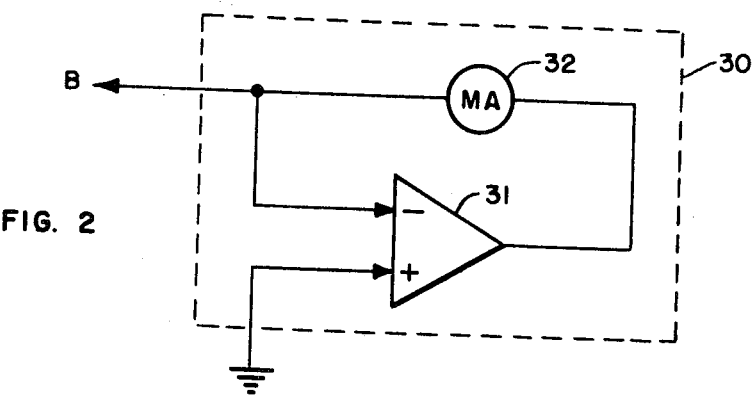
FIG. 2 shows a current measuring device which may be used in accordance with the test illustrated in FIG. 1.

Referring now to FIG. 2, there is shown a current measuring device 30 which exhibits an extremely low impedance to the current flowing between the node B and ground. This measuring device uses a conventional differential operational amplifier 31 having the inverting input thereto connected to the node at which the current is to be measured. The other input to the operational amplifier 31 is connected to ground, which also is used as the ground in the driving circuits 16 and 17. In order to measure the current at the node B, the output of the operational amplifier 31 is fed back through a milliammeter 32 to the inverting input of the amplifier 31; so that the operational amplifier 31 attempts to equalize the voltages appearing at its inputs, resulting in an extremely low voltage being present across the low-impedance measuring circuit 30 including the operational amplifier 31 and milliammeter 32. This impedance is chosen to be substantially less than the impedance across the output driving element of the driving circuit 17; so that essentially all of the node current normally flowing through the driving circuit 17 is diverted therefrom and flows through the low-impedance current measuring device 30. This occurs even if the node B driving circuit 17 happens to be biased into full conduction at the time the test is made. Thus, it is possible to measure accurately the current at the node B without breaking into any of the leads of the circuit as would be necessary to perform a conventional test, since the current flowing in a circuit generally must flow through an ammeter or milliammeter connected in series in the circuit.

The circuit described above in conjunction with the preferred embodiment of the invention provides a relatively simple way of isolating a defective diode in an integrated circuit package by performing an in-circuit test which requires no alterations in the normal operation of the system of which the integrated circuit package is a part.

Although a particular embodiment of the invention is shown in the drawing and has been described in the foregoing specification, other modifications of the invention varied to fit particular operating conditions, will be apparent to those skilled in the art; and the invention is not to be considered limited to the embodiment chosen for purposes of disclosure, but it covers all changes and modifications which do not constitute departures from the true scope of the invention.

What is claimed is:

1. A method of performing an in-circuit test for the reverse current leakage of diodes interconnected in a gating arrangement having at least two diodes comprising the steps of:
    equalizing the potential across the diode to be tested;
    measuring the current flowing at the input of another diode in the gate;
    raising the potential at the input of the diode under test to an amount sufficient to back-bias that diode; and
    measuring again the current at the input of the other diode.

2. A method according to claim 1 wherein equalizing the potential applied across the diode under test and raising the potential at the input of the diode under test is achieved by connecting an auxiliary source of potential to the input terminal of that diode.

3. A method for testing diodes for the reverse current characteristics thereof comprising the steps of:
    connecting the anodes of at least two diodes to a common point;
    connecting a source of potential to said common point;
    causing the potential at the cathode of the diode under test to be the same as the potential appearing on the anode thereof;
    measuring the current flowing out of the cathode of the other of the diodes to establish a reference current;
    raising the potential applied to the cathode of the diode under test to back-bias that diode; and
    measuring the increased current, if any, flowing out of the cathode of the other of the diodes.

4. A method according to claim 3 wherein causing the potential at the cathode of the diode under test to be the same as the potential appearing on the anode thereof and raising the potential at the cathode of the test diode to back-bias the test diode are accomplished by overriding the normal inputs to the test diode.

5. A method for measuring the reverse current characteristics of one diode out of a plurality of diodes, each having one terminal thereof connected to a common node to form a gate and having a source of potential supplied to said common node comprising the steps of:
- connecting an equalizing potential across the diode, the reverse current characteristics of which are to be measured;
- measuring the current flowing through one of the other diodes connected in said gate to establish a reference current;
- connecting a back-biasing potential across the diode under test; and
- measuring the increased current, if any, flowing through said one of the other of the diodes.

6. A method according to claim 5 wherein the measuring is accomplished by connecting a low-impedance measuring device to the diode, through which the current is being measured without breaking into the normal circuit connected to that diode.

7. A method according to claim 5 wherein the connecting of the equalizing potential and the connecting of the back-biasing potential across the diode under test results in an overriding of the inputs normally applied to that diode.

8. A circuit for testing the diodes of a gate for reverse current leakage including:
- at least two diodes each having one terminal thereof connected to a common node as an output terminal to form a gate;
- means for equalizing the potential across one of the diodes of said gate so that no current flows therethrough;
- means for measuring the current at the input of the other diode to provide a reference current; and
- means for raising the potential at the input of the diode under test to an amount sufficient to back-bias that diode, whereby the increased current measured by the measuring means is an indication of the reverse leakage characteristic of the diode under test.

9. A circuit according to claim 8 wherein the measuring means is a low-impedance current measuring device.

10. A circuit according to claim 9 wherein the means for equalizing the potential across the diode under test and the means for raising the potential at the input of the diode under test override the normal inputs applied to the diode.

References Cited

UNITED STATES PATENTS 3,445,769  5/1969  Erath _____ 324—158

RUDOLPH V. ROLINEC, Primary Examiner

E. L. STOLARUN, Assistant Examiner